United States Patent [19]

Stefanik

[11] 4,046,951
[45] Sept. 6, 1977

[54] LAMINATED TRANSPARENT ASSEMBLY WITH EDGE SEALING MEANS

[75] Inventor: John E. Stefanik, Lower Burrell, Pa.

[73] Assignee: PPG Industries, Inc., Pittsburgh, Pa.

[21] Appl. No.: 737,467

[22] Filed: Nov. 1, 1976

[51] Int. Cl.² .................... B32B 3/02; B32B 31/04; B60J 1/06
[52] U.S. Cl. .................. 428/412; 428/38; 428/81; 428/189; 428/192; 428/215; 428/421; 428/424; 428/425; 428/429; 428/447
[58] Field of Search .................. 428/38, 81, 189, 192, 428/194, 213–216, 421, 422, 424, 425, 429, 412, 447; 156/106, 107

[56] References Cited

U.S. PATENT DOCUMENTS

| | | | |
|---|---|---|---|
| 1,845,133 | 2/1932 | Davis | 428/81 |
| 2,303,125 | 11/1942 | Knight | 428/38 |
| 2,750,312 | 6/1956 | Bloom, Jr. et al. | 428/38 |
| 2,787,608 | 4/1957 | Gregory et al. | 260/79.1 |
| 2,871,144 | 1/1959 | Doban | 427/322 |
| 2,925,633 | 2/1960 | Morgan et al. | 52/309.3 |
| 2,964,503 | 12/1960 | Carpenter et al. | 260/79.1 |
| 3,225,017 | 12/1965 | Seegman et al. | 260/79.1 |
| 3,248,273 | 4/1966 | Boicey | 428/38 |
| 3,388,945 | 6/1968 | Kevelin et al. | 296/145 |
| 3,505,160 | 4/1970 | Michaels et al. | 428/421 |
| 3,549,466 | 12/1970 | Kay et al. | 428/38 |
| 3,616,122 | 10/1971 | Orcutt | 428/38 |
| 3,673,054 | 6/1972 | Wright et al. | 428/422 |
| 3,733,237 | 5/1973 | Wolff | 156/107 |
| 3,919,023 | 11/1975 | Bowser et al. | 156/107 |

*Primary Examiner*—William J. Van Balen
*Attorney, Agent, or Firm*—Edward I. Mates

[57] ABSTRACT

This invention relates to laminated transparent assemblies having novel composite edge sealing means of organic composition consisting essentially of a thin barrier layer of an organofluoro composition selected from the class consisting of fluorinated ethylene polymers and copolymers of fluorinated ethylene and fluorinated propylene having a high resistance to moisture penetration and a sealant layer and/or a cushion coat selected from the class consisting of polysulfides, silicones and fluorosilicones having an adhesive bond to the transparent lamina of the laminated transparent assembly and to the barrier layer and some moisture resistant properties to provide a composite edge seal that is suitably adhered to the marginal edge of the laminated transparent assembly.

14 Claims, 3 Drawing Figures

LAMINATED TRANSPARENT ASSEMBLY WITH EDGE SEALING MEANS

BACKGROUND OF THE INVENTION

This invention relates to laminated transparent assemblies, and particularly to laminated transparent assemblies provided with interlayer materials laminated to other lamina, which are composed of glass or other well-known rigid transparent materials, such as organic substitutes for glass including polycarbonates, acrylic esters, polyesters and rigid transparent polyurethanes, as is well known in the art of laminated transparencies for aircraft.

Interlayers of polyvinyl acetals such as polyvinyl butyral plasticized with well-known plasticizers, such as triethylene glycol di-2-ethyl (butyrate), dibutyl sebacate, and other monocarboxylic aliphatic acid esters of ether glycols, and interlayers composed of polyurethane resins lose their adhesive properties to glass and other rigid transparent materials that are substituted for glass in transparent laminates used as aircraft windows when the interlayers are exposed to moisture. The aircraft transparency art has sought an edge sealing materials that would prevent atmospheric moisture and chemicals from penetrating into the interlayer material and cause deterioration of the bond between the interlayer and the rigid transparent layers that constitute the laminated transparency.

Various metals have been either sprayed or applied in the form of tape adhered with either a silicone adhesive or with solder. However, it is difficult to form a metal foil to conform exactly to the edge of a laminted transparency, particularly when certain layers of the transparency have their edges offset from the edges of certain other layers. When metal is sprayed onto an edge surface, it is difficult to form a continuous coating by having the metal particles coalesce. Furthermore, metal materials do not adhere well to the conventional interlayer materials. In addition, many aircraft installations comprise an electroconductive heating circuit either formed of wires carried by the interlayer or in the form of a transparent electroconductive coating of a metal or metal oxide applied to a surface of one of the rigid transparent layers that faces the interlayer. Under such circumstances, if the edge sealing composition is a metal, moisture causes a short circuit between the edge seal and the components of the heating circuit carried by the interlayer or by a transparent rigid layer. It is necessary to maintain electrical insulation between the heating circuit and the edge seal.

Non-metallic sealing compositions consisting of silicones, polysulfides, polyurethanes, acrylics, and other organic materials are not totally effective for edge sealing for aircraft, automotive and other laminated panels with interlayer materials interposed between outer lamina in laminated panels. These materials are not sufficiently impervious to moisture and chemicals that attack interlayer materials to the degree required to protect the interlayer materials from exposure to water, liquids or vapors that cause degradation of the interlayer material and can lead to edge separation, delamination, or bubbling, and can also lead to breakdown in the insulation to electrical components of a heated window and result in shorted circuits in leads, bus bars or electrical connections. Laminated assemblies using a rigid plastic substitute for at least one glass sheet also need effective sealing because of some susceptibility of rigid plastic substitutes such as polycarbonates, acrylics, and the like to moisture and chemical degradation. Moisture and chemical degradation from water, liquids or vapors can lead to crazing, craking and loss in physical and structural properties of the rigid plastic, particularly at mounting edges and at bolt holes which receive bolts that attach the transparency to an aircraft frame.

Edge barrier films are required that are thin, flexible, impervious to moisture and chemical liquids and vapor and that do not react to degrade the components of the aircraft transparency on contact therewith. Compositions having suitable vapor imperviousness include organic fluoro plastic polymers and copolymers such as polytetrafluoroethylene and fluorinated ethylene-propylene copolymers sold under the trademark TEFLON. These have the lowest moisture absorption and transmission properties (practically zero) of all organic materials tested in thin film form and also have good resistance to chemicals and excellent electrical insulating properties. However, these materials normally are not bondable, but the surfaces can be treated to make them bondable. These treated materials adhere to conventional interlayer materials such as plasticized polyvinyl acetals, particularly the butyral, and polyurethanes, but they do not adhere well to glass, acrylics, polycarbonates and other well-known rigid transparent organic plastics that are substituted for glass in certain aircraft laminated transparencies. Once the edge barrier films delaminate from the edge of the glass or rigid plastic, they expose the interlayer to atmospheric moisture and chemicals. Such exposure results in the delamination of the interlayer from the adjacent rigid transparent layers and degradation of the interlayer.

SUMMARY OF THE INVENTION

According to the present invention, laminated transparencies are provided with improved edge seal systems that comprise a barrier layer composed of an organic fluorinated polymeric composition selected from the class consisting of fluoroethylene and copolymers of fluoroethylene and fluoropropylene extending completely around the marginal portion of the laminated transparency and wider than the interlayer thickness so that it is superimposed completely across the edge of the interlayer material and extends onto the adjacent edges of the rigid transparent layers adjacent to the interlayer. The improved edge seal system of the present invention also comprises an additional thin sealant layer of a composition having overall better adhesion to the edge of the components of the laminated transparency than the barrier layer, such as a polysulfide, fluorosilicone or silicone rubber, to improve the adhesion of the barrier layer to the edge of the transparency. The edge seal system may also include a cushion layer or coat of an adhesive such as a polysulfide, fluorosilicone or silicone rubber superimposed over the barrier layer. The combined edge system of barrier layer and cushion layer behaves synergistically with more improvement than the combined individual improvements.

The present invention will be understood more thoroughly in the light of a description of illustrative embodiments thereof which follow.

BRIEF DESCRIPTION OF THE DRAWINGS

In the drawings which form part of a description of the illustrative embodiments and wherein like structural numbers refer to like structural elements.

DESCRIPTION OF THE PREFERRED EMBODIMENTS

Figure 1:
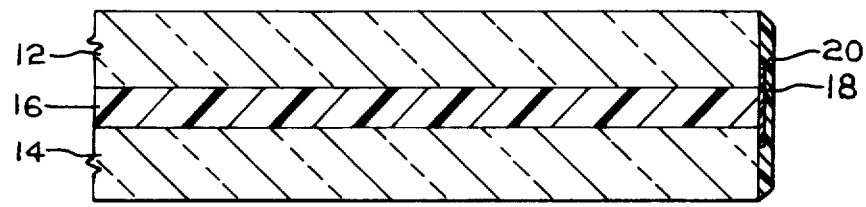
FIG. 1 is a fragmentary cross-sectional view of an edge portion of one embodiment of the present invention comprising a glass-plastic laminate having a composite edge seal comprising a barrier layer of an organic fluorinated polymer and a cushion coat of a silicone or a fluorosilicone that is formed in situ during lamination of the embodiment.
Figure 2:
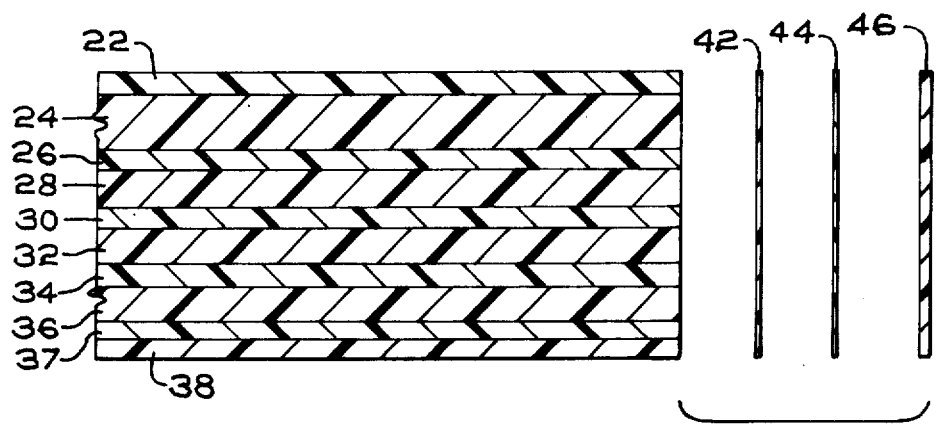
FIG. 2 is a sectional view similar to FIG. 1 showing an all plastic laminate with components edge seal systems that were included or omitted for testing purposes shown in exploded view.

Referring to the drawings, FIG. 1 discloses a laminated transparency typical of test specimens and to demonstrate construction of windows for light planes. This embodiment comprises a first sheet of glass 12 and a second sheet of glass 14 that are bonded together by a sheet of interlayer material 16. In one test of this invention, control transparencies which were tested and compared with embodiments of this invention consisted of the elements just mentioned. Other control transparencies consisted of the elements just mentioned with various materials applied against the marginal edge to determine their suitability as edge seal systems.

A first embodiment of the present invention comprises, in addition to the elements of a control transparency, a novel edge seal system comprising a thin barrier layer 18 of an organic fluorinated polymer selected from the class consisting of fluoroethylene polymers such as tetrafluoroethylene and copolymers of fluoroethylene and fluoropropylene such as a copolymer of tetrafluoroethylene and hexafluoropropylene. The thin barrier layer, preferably 2 to 5 mils (0.05 to 0.13 millimeter) thick, is bonded to the edge of the interlayer 16 completely around the perimeter thereof. The barrier layer 18 preferably has its surface treated with a solution of an alkali metal addition component, preferably a sodium addition component, to improve its adhesion. Typical treatments are disclosed in U.S. Pat. No. 2,871,144 to Doban. The barrier layer 18 is in the form of a tape which is treated with a sodium addition component such as a tetrahydrofurane solution of a sodium addition component obtained by reacting sodium or other alkali metals with an aromatic hydrocarbon and thereafter treating the surface with methanol. Typical reaction products for sodium and other finely divided alkali metals include naphthalene, anthracene and biphenyl. The barrier layer is preferably in the form of a tape slightly wider than the thickness of the interlayer sheet 16 and superimposed thereover so that it completely covers the edge of the interlayer sheet 16.

Even though the barrier layer of tetrafluoroethylene or a copolymer of tetrafluoroethylene and hexafluoropropylene is treated as suggested in the Doban patent to promote adhesion that is obtainable with heat and pressure, other adhesives are required to complete bonds of this barrier layer to lamina substrates at room temperature. Such adhesives which are also sealing materials can be silicones, fluorinated silicones and polysulfides because of their good superior adhesion properties to glass and rigid plastic substitutes for glass. In the FIG. 1 embodiment, a layer 20 of a silicone, fluorosilicone, or polysulfide is applied over the barrier layer 18 and along the edge surfaces of the glass sheets 12 and 14 to provide a cushion coat 20 extending across the entire thickness of the transparency of FIG. 1. A particularly good cushion coat resulted from using Silastic® 1125U silicone rubber which consists essentially of a dimethyl vinyl polysiloxane polymer and reinforcing silica filler, which is heat vulcanizable.

The specimens for exposure testing reported in TABLE 1 contained two glass sheets, each 6 inches (152 millimeters) long, 3 inches (76 millimeters) wide, and ¼ inch (6 millimeters) thick, and an interlayer of polyurethane 90 mils (2.3 millimeters) thick. Some had no edge seal system. Some had an edge seal system consisting of a sealant bond composed of a heat vulcanizable silicone (depicted as HV silicone). Some had an edge seal system comprising a barrier layer 18 about 5 mils (0.13 millimeter) thick and ⅛ inch (3 millimeters) wide superimposed around the entire margin of the interlayer and cushion coat of a heat vulcanizable silicone applied over the barrier layer and the remainder of the thickness of the laminated transparency and was about 60 mils (0.15 millimeter) thick. Other specimens had only a barrier layer of treated fluorinated alkylene polymers and copolymers applied directly to the marginal edge of the interlayer and the glass.

The control laminates were fabricated by assembling two glass sheets with a sheet of polyurethane interlayer, enclosing the resulting assembly in a bag, evacuating and sealing the bag and subjecting the bag and its contents to a standard autoclave cycle of 200 psi (13.6 atmospheres) and 275° F. (135° C.) for 45 minutes. The test laminates were identical to the control laminates except for the addition of different edge seal systems that were applied around the edge of the glass-plastic assemblies before enclosure in a bag for lamination.

After lamination, some of the laminates were exposed to high humidity atmospheres at 125° F. (52° C.) and 95 precent relative humidity and others to 200° F. (93° C.) and 100 percent relative humidity. Each laminate was inspected periodically for discoloration inward of the edge, a sign of moisture penetration.

TABLE 1 discloses the superiority of an edge system comprising a barrier layer of tetrafluoroethylene superimposed over the entire perimeter of the interlayer and a heat vulcanizable silicone rubber as a cushion coat superimposed over the barrier layer. Other tests using the superior edge seal system of TABLE 1 provided general corresponding results but not of the same magnitude in glass-plastic laminates having interlayers of polyvinyl butyral plasticized with 21 parts of triethylene glycol di-2-ethyl butyrate per 100 parts resin as is standard use in laminated aircraft transparencies. Other tests with laminates having a copolymer of tetrafluoroethylene and hexafluoropropylene as the barrier layer and a cushion coat of a heat vulcanizable silicone provided corresponding results.

TABLE 1

GLASS-POLYURETHANE LAMINATES - EDGE SEAL SYSTEM BONDED IN AUTOCLAVE INTERLAYER MOISTURE PENETRATION[1] AT 200° F. - 100% RH EXPOSURE

EDGE SEAL SYSTEM

TABLE 1-continued

GLASS-POLYURETHANE LAMINATES - EDGE SEAL SYSTEM BONDED IN
AUTOCLAVE INTERLAYER MOISTURE PENETRATION[1] AT 200° F. - 100% RH EXPOSURE

| Sealant Bond | Barrier Layer | Cushion Coat | DAYS EXPOSURE | | | | | | | |
|---|---|---|---|---|---|---|---|---|---|---|
| | | | 2 | 4 | 6 | 8 | 10 | 12 | 14 | 16 |
| None | None | None | .15 | .23 | .31 | .35 | .45 | .60 | 1.15 | 1.50[c] |
| HVSilicone | None | None | .15 | .20 | .25 | .28 | .30 | .38 | .45 | .45 |
| None | TFE | None | .12 | .25 | .33 | .35 | .48 | .48[2] | .65[2] | .75[2] |
| None | TFE | HVSilicone | 0 | 0 | .15 | .18 | .20 | .18 | .23 | .23 |

INTERLAYER MOISTURE PENETRATION[1] AT 125° F. - 95% RH EXPOSURE

| Sealant Bond | Barrier Layer | Cushion Coat | WEEKS EXPOSURE | | | | | | |
|---|---|---|---|---|---|---|---|---|---|
| | | | 1 | 2 | 4 | 6 | 8 | 10 | 14 |
| None | None | None | .08 | .08 | .18 | .20 | 1.50[c] | c | c |
| HVSilicone | None | None | .13 | .23 | .23 | .28 | .30 | .35 | .38 |
| None | TFE | None | .03 | .05 | .14 | .20 | .30 | .93 | .93 |
| None | TFE | HVSilicone | 0 | 0 | 0 | .08 | .20 | .23 | .28 |

[1]Average of maximum penetration in inches at sides (Discounting Corners)
[2]Results of single specimens only
[c] Complete moisture penetration at sides on a 3 inch wide specimen
TFE - Tetrafluoroethylene polymer
HVSilicone - Dimethyl vinyl polysiloxane and silica filler Having demonstrated the superiority of the two component edge barrier system comprising a barrier layer of fluorinated alkylene polymers and copolymers and a cushion coat of a heat vulcanizable silicone or fluorosilicone, additional experiments were performed on a multiple ply all plastic laminated transparency to determine whether room temperature vulcanizable adhesive compositions could be used in combination with the organofluoro alkylene polymers that can be applied to the edge of an all plastic laminated transparency and cured at room temperature. Accordingly, laminates approximately 3.4 inches (86 millimeters) square containing ten plies were prepared by assembling, laminating and cutting to size the following components in succession: an outer protective ply 22 of acrylic plastic (polymethyl methacrylate) 60 mils (1.5 millimeter) thick fusion bonded to a sheet of polycarbonate 24 3/16 inch (4.6 millimeters) thick followed by a first interlayer ply 26 of polyurethane 60 mils (1.5 millimeter) thick, a second layer 28 of polycarbonate 125 mils (3.1 millimeters) thick, a second interlayer ply 30 of polyurethane 60 mils (1.5 millimeter) thick, a third layer of polycarbonate 32 125 mils (3.1 millimeters) thick, a third interlayer ply 34 of polyurethane 60 mils (1.5 millimeter) thick, a fourth layer of polycarbonate 36 125 mils (3.1 millimeters) thick, a fourth interlayer ply 37 60 mils (1.5 millimeter) thick and an innermost layer of acrylic plastic 38 60 mils (1.5 millimeter) thick. The plastic assembly was assembled and inserted in a bag as with the assembly of FIG. 1 and the bag was evacuated and sealed. The bag and its contents were subjected to an autoclave treatment for 30 to 60 minutes, preferably about 45 minutes, at a pressure of 200 psi (13.6 atmospheres) and a temperature of 275° to 300° F. (135° to 149° C.). The laminated assemblies that resulted were cut to rectangular laminates. Some of the control laminates were fabricated without an edge seal system. Others were provided with a sealant bond 42 applied directly to the marginal edge of the all plastic assembly. Still others were provided with a barrier layer 44 of an organofluoro alkylene polymer or copolymer of the type used in the barrier layer 18 of the embodiment of FIG. 1 superimposed and bonded in a thickness of 2 to 5 mils (0.05 to 0.13 millimeter) with the 1 to 5 mil (0.025 to 0.13 millimeter) thick sealant bond 42. A cushion coat 46 about 60 mils (0.15 millimeter) thick of a room temperature vulcanizable adhesive such as a polysulfide, fluorosilicone or a silicone rubber paste curable at room temperature was applied to certain laminates tested.

After the laminates were laminated, they were stored for at least three days under normal room conditions before being submitted to eight weeks of exposure tests where moisture penetration was measured by detecting changes in color and measuring the width of the marginal areas inward from the edges in a direction normal to the edges.

The best moisture impervious edge seal systems that were cured at room temperature resulted from those containing a barrier film of tetrafluoroethylene polymer or copolymer of tetrafluoroethylene and hexafluoropropylene with polysulfide adhesives containing chrome accelerator (PR-1435). However, since a polysulfide comprising a styrene/butadiene copolymer (in about 95:5 ratio) cured with lead dioxide paste (PR-1221) showed good sealant properties after four weeks of exposure at 125° F. (52° C.) and 95 percent relative humidity, and would not react chemically with the polyurethane interlayer, it was preferred as a material that vulcanized at room temperature over all other materials tested in combination with the organofluoro polymers and copolymers used as the barrier layers.

The test results of eight weeks of exposure at 125° F. (52° C.) and 95 percent relative humidity are reported in TABLE 2.

TABLE 2

POLYCARBONATE - POLYURETHANE LAMINATES -
EDGE SEAL SYSTEM BONDED AT ROOM TEMP.
INTERLAYER MOISTURE PENETRATION[1]
AT 125° F. - 95% RH EXPOSURE

| Sealant Bond | Barrier Layer | Cushion Coat | WEEKS EXPOSURE | | | | |
|---|---|---|---|---|---|---|---|
| | | | 1 | 2 | 4 | 6 | 8 |
| None | None | None | .10 | .15 | .75 | 1.20 | 1.50[c] |
| PR-1435 | None | None | .10 | .20 | — | .80 | 1.20 |
| DC-94-002 | None | None | .10 | .15 | .55 | .80 | 1.50[c] |
| PR-1221 | TFE | PR-1221 | 0 | 0 | 0 | .75 | .90 |
| PR-1221 | Al Foil | PR-1221 | 0 | 0 | 0 | .75 | .90 |
| PR-1221 | TFE | DC-30-121 | 0 | 0 | 0 | .80 | 1.20 |
| PR-1435 | TFE | PR-1435 | 0 | 0 | 0 | 0 | NEG |
| DC-94-002[2] | TFE | None | 0 | 0 | 0 | 0 | NEG |

[1]Maximum penetration in inches at sides (Discounting Corners)
[2]Two coat application; first coat cured completely at room temperature; second coat bonded at room temperature
PR-1435 - Dichromate cured polysulfide (Products Research and Chemical - Proprietary)
DC-94-002 - Dimethyl vinyl polysiloxane with trifluoropropyl, chloro or alkyl

TABLE 2-continued
POLYCARBONATE - POLYURETHANE LAMINATES - EDGE SEAL SYSTEM BONDED AT ROOM TEMP. INTERLAYER MOISTURE PENETRATION[1] AT 125° F. - 95% RH EXPOSURE group replacing a methyl group, and iron oxide filler by analysis (Dow Dorning - Proprietary)
PR-1221 - Styrene/styrene butadiene copolymer cured with lead dioxide paste (Products Research and Chemical - Proprietary)
DC-30-121 - Silicone rubber paste curable at room temperature (Dow Corning - Proprietary)
TFE - Tetrafluoroethylene polymer The present invention is used as an edge seal system for a laminate depicted in FIG. 3 as comprising an outer glass ply 50, an interlayer 52 of polyurethane and an inner layer 54 of stretched acrylic. The latter is preferably polymethyl methacrylate (Plexiglas 55) that is stretched and press polished by the method described in U.S. Pat. No. 3,632,841 to Fortin, preferably using a pair of polished glass sheets coated with polytetrafluoroethylene lubricant to apply pressure against the opposite major surfaces of a polymethyl methacrylate sheet heated to between 250° F. and 330° F. to cause the plastic to flow laterally and stretch, cooling the stretched acrylic at a controlled cooling rate to below 250° F. and releasing the pressure.

The outer glass sheet 54 has a thin silane primer 56 (preferably a proprietary silane sold by General Electric as SS-4088 silane). A barrier layer 58 of tetrafluoroethylene or a copolymer of tetrafluoroethylene with hexafluoropropylene is applied around the marginal edge of the interlayer 52 and slightly beyond the interfacial surface between the outer glass ply 50 and the interlayer 52 for use as the barrier layer, and a cushion coat 60 of a heat vulcanizable silicone is superimposed over the silane primed edge of the glass ply 50 and the marginal edge of the interlayer 52 which are in alignment throughout the perimeter of the assembly. The inner layer 54 of stretched acrylic is larger in area than the other two layers.

Figure 3:
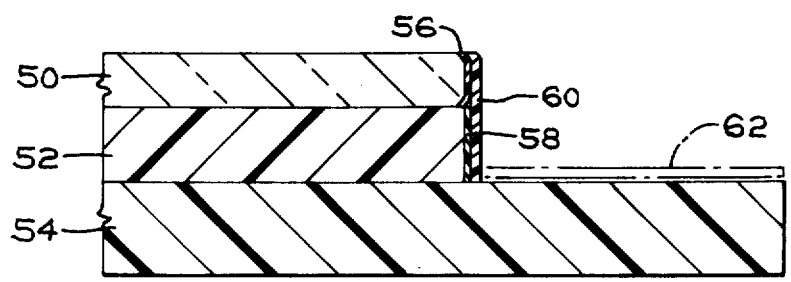
FIG. 3 is a view similar to FIGS. 1 and 2 of a third embodiment of this invention comprising glass and rigid plastic plies of different areas laminated together and provided with an edge seal system conforming to the present invention.

A two-stage lamination is preferred to fabricate the transparency depicted in FIG. 3. In the first stage, the glass sheet 50 and the sheet of interlayer 52 are assembled with the silane primer 56 applied around the marginal edge of the glass sheet and the barrier layer 58 applied around the marginal edge of the interlayer and the cushion coat 60 applied around the marginal edge of the assembly. A second glass sheet having a layer of parting material such as dimethyl dichlorosilane applied to a surface thereof is placed with its coated surface against the exposed surface of the interlayer sheet 58, the assembly is taped with an easily removable tape, inserted in a laminating bag, the bag evacuated and the assembly subjected to an autoclave cycle of 45 minutes at a temperature of 275° F. to 300° F. (135° C. to 149° C.) and at a pressure of 200 psi (13.6 atmospheres) to provide a sublaminate to be subsequently laminated to a layer 54 of stretched acrylic. The sublaminate including the glass sheet containing the parting material is stored until one is ready to perform the second laminating step. At this time the glass sheet containing the parting material is separated from the rest of the sublaminate, leaving a smoothly surface interlayer surface exposed.

In the second laminating step, the press polished surfaces of stretched acrylic sheet 54 is assembled with a smooth surface facing the smooth surface of the interlayer 52, the exposed major surface of the stretched acrylic 54 extending beyond the margin of the subassembly previously laminated. Optionally, a layer 62 of a sealant that vulcanizes at room temperature, such as a room temperature vulcanizing silicone or a polysulfide, or a composite laminate, such as an edge sealing system, may be applied to the extended portion of acrylic plastic as shown in phantom in FIG. 3. The sublaminate and the stretched acrylic sheet 54 are then assembled with a frame of metal facing the marginal extension of the stretched acrylic with suitable parting material such as TEFLON between the components to be laminated and the metal frame. The assembly is placed in a bag, which is evacuated and sealed, and the assembly including the sublaminate subjected to 30 to 60 minutes of a pressure of 200 psi (13.6 atmospheres) and a temperature of 200 to 210° F. (93 to 99° C.). The laminated transparency that results exhibited no moisture penetration after two weeks exposure to the conditions of exposure in the tests to which laminates were subjected in assembling the data for TABLE 2.

The results of these tests indicated that an edge sealing system containing a barrier layer of a fluorinated polymer selected from the class consisting of fluorinated ethylene polymers and copolymers of fluorinated ethylene and fluorinated propylene bonded to the edge of the interlayer completely around the perimeter thereof and completely covering the edge of the interlayer and a sealant layer having greater adhesion to the edge of the transparency than said barrier layer and selected from the class consisting of polysulfides, room temperature vulcanizing and heat vulcanizable silicones and fluorosilicones at least coextensive in width with the barrier layer provides superior resistance to mositure penetration than prior art edge seal systems.

The components of the edge sealing systems whose moisture exposure test results are reported in TABLES 1 and 2 are mostly available as proprietary compositions and the chemical compositions reported therein are based on chemical and spectral analysis. The other components of various laminated transparencies used in aircraft and security glazing comprise components that are well known in the laminated transparency art.

The rigid, transparent elements may be composed of any well known glass composition suitable for use in aircraft. The glass is preferably chemically tempered by ion exchange at an elevated temperature below the strain point of the glass. Typical ion exchange techniques for chemically tempering glass are found in U.S. Pat. No. 3,218,220 to Weber and U.S. Pat. No. 3,477,834 to Morris.

Conventional substitutes for glass include polycarbonates, such as those described in U.S. Pat. No. 3,028,365 to Schnell et al. Other substitutes for glass are acrylic plastics, preferably polymethyl methacrylate. The latter include materials sold under the trademark PLEXIGLAS II, such as described in Military Specification MIL-P-5425 and under the trademark PLEXIGLAS 55, such as described in Military Specification MIL-P-8184.

The interlayer materials suitable for laminated transparencies whose edges are protected by the edge sealing system of the present invention may be either plasticized polyvinyl acetal resins, particularly polyvinyl butyral described in detail in U.S. Pat. No. 2,372,522 to Strauss, and various polyurethane interlayer materials, such as those described in U.S. Pat. No. 3,509,015 to Wismer et al and U.S. Pat. No. 3,931,113 to Seeger et al.

Many well-known plasticizers suitable for use with polyvinyl butyral are disclosed in U.S. Pat. No. 2,526,728 to Burke et al. The most commonly used plasticizers are monocarboxylic aliphatic acid esters of ether glycols, such as triethylene glycol di-2-ethyl butyrate. Conventionally, in laminated transparencies for use in aircraft, polyvinyl butyral is plasticized with 21 parts by weight of triethylene glycol di-2-ethyl butyrate per 100 parts of resin unless the plasticizer and the plasticizer concentration is otherwise specified. This plasticizer convention is spelled out in Military Specification MIL-G-25871A (ASG) dated July 30, 1958.

The optimum edge sealing systems of the present invention comprise a thin barrier layer of a fluorinated polymer selected from the class consisting of fluoroethylene polymers and copolymers of fluoroethylene and fluoropropylene having a width slightly greater than the thickness of the interlayer so that the barrier layer can be applied to extend over the entire thickness of the interlayer and over the interfaces with the adjacent rigid transparent layers of the transparency. The barrier layer has a major surface in close juxtaposition to the edge of the laminated transparency to be protected, and particularly, the edge of the interlayer, so that a barrier layer of a material having superior penetration resisting properties to moisture and chemicals extend over the entire edge of the interlayer in closely spaced relation thereto so that the thickness of the barrier layer bars the penetration of moisture and other materials detrimental to the interlayer and to the interfacial surface between the interlayer and the adjacent rigid transparent layers of the laminated transparency. The improved edge sealing system of the present invention also incorporates an additional layer of a superior adhesive composition, such as a polysulfide, a silicone or a fluorosilicone, at least coextensive in width with the barrier layer, to improve the bond between the barrier layer and the edge of the transparency. When a portion of the thin layer of superior adhesive composition is interposed between the barrier layer and the interlayer, it provides a very narrow space that is somewhat less resistant to the penetration of moisture and other chemicals than the barrier layer, but which provides improved adhesion between the barrier layer and the edge of the transparency. The optional inclusion of a cushion layer of an adhesive composition of the type used for a sealant layer improves the adhesion of the thin barrier layer to the edge of the transparency without appreciably affecting the ability of the edge sealing system to resist penetration of moisture and other chemicals into the interlayer and the interfacial surfaces between the interlayer and the rigid transparent layers adjacent to the opposite sides of the interlayer.

According to this invention, the optimum edge sealing system to be applied prior to lamination comprises a barrier layer of tetrafluoroethylene combined with one or more adhesive layers of a silicone rubber or a fluorosilicone that is heat curable so that during lamination it cures to form a sealant layer and/or a cushion layer, whereas the optimum edge sealing system applied after lamination comprises a barrier layer of tetrafluoroethylene combined with one or more adhesive layers of a polysulfide or silicone or fluorosilicone that cures at room temperature. However, barrier layers of copolymers of tetrafluoroethylene and hexafluoropropylene are also satisfactory. While it is preferred that a two component polysulfide adhesive be cured with lead peroxide, other well-known curing compositions, such as chromium compositions, may also be used as a component of a two component polysulfide system.

The characteristics of the barrier layer that render it most suitable for use as a component of an edge sealing system according to the present invention are a low vapor transmission rate (MVTR — preferably less than 0.5 grams per hundred square inches per day per mil thickness) and a low rate of water absorption (ABS — preferably less than 0.01 percent per day), flexibility, ease of handling in tape form and lack of chemical reaction with the components of the transparency, particularly the interlayer thereof, and other chemicals to which the barrier layer is likely to be exposed during application of the edge sealing system to a laminated transparency. The values in the units stated for moisture vapor transmission rates for the most desirable embodiments of barrier layers determined from American Society for Testing and Materials (ASTM) test E96-53T and for water absorption rates (ABS) available in the literature for these materials are:

|  | MVTR | ABS |
|---|---|---|
| Polytetrafluoroethylene (TFE) | 0.20 | NIL |
| Fluorinated ethylene-propylene copolymer (FEP) | 0.40 | Less than 0.01% |

The forms of the invention shown and described in this disclosure represent an illustrative preferred embodiment and certain modifications thereof. It is understood that various changes may be made without departing from the gist of the invention as defined in the claimed subject matter that follos.

I claim:

1. A laminated transparency comprising two transparent layers of rigid material selected from the class consisting of glass, polycarbonates, acrylic plastics and other rigid transparent plastics commonly used as a substitute for glass bonded together by an interlayer of given thickness composed of a material selected from the class consisting of polyvinyl acetals and polyurethanes, a composite edge sealing system comprising a thin barrier layer of a fluorinated polymer selected from the class consisting of fluoroethylene polymers and copolymers of fluoroethylene and fluoropropylene having a width greater than the thickness of said interlayer and bonded to the edge of said interlayer completely around the perimeter thereof and completely covering said edge of said interlayer and a sealant layer having greater adhesion to the edge of said transparency than said barrier layer and composed of a composition selected from the class consisting of polysulfides, silicones and fluorosilicones at least coextensive in width with said barrier layer bonding said barrier layer to said transparency in such a manner as to improve the strength of the bond between said barrier layer and the edge of said interlayer.

2. A laminated transparency as in claim 1, further including a cushion coat of an adhesive composition selected from the class consisting of polysulfides, fluorosilicones and silicones superimposed over said barrier layer and over said sealant layer.

3. A laminated transparency as in claim 1, wherein said sealant layer has at least a portion thereof interposed between said thin barrier layer and the edge of said interlayer, said interposed portion of said sealant layer being thinner than the thickness of said barrier layer.

4. A laminated transparency as in claim 3, wherein said barrier layer has a thickness of 2 to 5 mils (0.05 to 0.13 millimeter).

5. A laminated transparency as in claim 1, wherein said barrier layer is polytetrafluoroethylene.

6. A laminated transparency as in claim 1, wherein said barrier layer is a copolymer of tetrafluoroethylene and hexafluoropropylene.

7. A laminated transparency as in claim 5, wherein said barrier layer is in direct contact with interlayer and has its surface treated with a tetrahydrofurane solution of an alkali metal addition compound to improve the adhesive properties of said barrier layer to the edge of said interlayer.

8. A laminated transparency as in claim 6, wherein said barrier layer is in direct contact with said interlayer and has its surface treated with a tetrahydrofurane solution of an alkali metal addition compound to improve the adhesive properties of said barrier layer.

9. A method of forming a laminated transparency comprising two transparent sheets of rigid transparent material selected from the class consisting of glass, polycarbonates, acrylic resins and other rigid organic materials usually substituted for glass, bonded together by an interlayer composed of a material selected from the class consisting of plasticized polyvinyl acetals and polyurethanes and a composite edge sealing system comprising a thin barrier layer of an organic fluorinated polymer selected from the class consisting of fluoroethylene polymers and copolymers of fluoroethylene and fluoropropylene comprising assembling said rigid sheets and said interlayer to form a sandwich, enclosing the entire marginal edge of said interlayer within a tape of said organic fluorinated polymer, enclosing the periphery of said sandwich and said tape within a cushion layer of a composition selected from the class consisting of silicones and fluorosilicones adherent to said tape and to said rigid transparent material to form an assembly, inserting said assembly in a bag, evacuating and sealing the bag, and subjecting said bag and said assembly to an elevated temperature and pressure sufficient to seal said barrier layer to the marginal portion of said interlayer and to bond said rigid sheets to the opposite surfaces of said interlayer and to bond said cushion layer to said barrier layer and said rigid sheets.

10. The method as in claim 9, further including the step of treating the surfaces of said tape with a tetrahydrofurane solution of an alkali metal addition compound to improve the adhesive properties of said tape prior to enclosing said marginal edge with said tape.

11. A method of forming a laminated transparency comprising two transparent sheets of rigid transparent material selected from the class consisting of glass, polycarbonates, acrylic resins and other rigid organic materials usually substituted for glass, bonded together by an interlayer composed of a material selected from the class consisting of plasticized polyvinyl acetals and polyurethanes and composite edge sealing system comprising a thin barrier layer of an organic fluorinated polymer selected from the class consisting of fluoroethylene polymers and copolymers of fluoroethylene and fluoropropylene extending around the edge of said transparency comprising assembling said rigid sheets and said interlayer to form an assembly, inserting said assembly in a bag, evacuating and sealing the bag, and subjecting said bag and said assembly to an elevated temperature and pressure sufficient to bond said rigid sheets to the opposite surfaces of said interlayer to form a laminated assembly, removing said laminated assembly from said bag, applying a sealant layer of a composition selected from the class of silicone rubbers and polysulfides that cure at room temperature to the marginal edge of said laminated assembly that results from said exposure to elevated temperature and pressure, applying a tape of said oganic fluorinated polymer around the entire marginal edge of said laminated assembly in alignment with the edge of said interlayer, and curing the assembly that results at room temperature.

12. The method as in claim 11, wherein said sealant layer is composed of a silicone rubber comprising applying a first layer of said silicone rubber to the edge of said assembly, curing said first layer, applying a second layer of silicone rubber to said first layer of silicone rubber after curing said first layer, enclosing said tape around said second layer of silicone rubber, and curing said assembly.

13. The method as in claim 11, wherein said sealant layer is composed of a polysulfide comprising applying a first layer of polysulfide to the edge of said laminated assembly to form a sealant layer of polysulfide, applying said tape to said sealant layer to form a barrier layer and applying a second layer of polysulfide to said barrier layer to form a cushion coat of polysulfide after said laminated assembly is removed from said bag, and curing said laminated assembly with said sealant layer, barrier layer and cushion coat applied to the edge of said assembly at room temperature.

14. The method as in claim 13, wherein said polysulfide layers are cured with lead peroxide.

* * * * *